(12) United States Patent
Brock

(10) Patent No.: US 8,448,779 B2
(45) Date of Patent: May 28, 2013

(54) ELEVATING CONVEYOR

(76) Inventor: Richard E. Brock, St. Marys, OH (US)

( * ) Notice: Subject to any disclaimer, the term of this patent is extended or adjusted under 35 U.S.C. 154(b) by 338 days.

(21) Appl. No.: 12/883,293

(22) Filed: Sep. 16, 2010

(65) Prior Publication Data

US 2012/0067703 A1  Mar. 22, 2012

(51) Int. Cl.
*B65G 33/20* (2006.01)

(52) U.S. Cl.
USPC ............................. 198/677; 198/662; 198/671

(58) Field of Classification Search
USPC ................... 198/550.4, 550.6, 658, 662, 663, 198/671, 673, 677
See application file for complete search history.

(56) References Cited

U.S. PATENT DOCUMENTS

| | | | |
|---|---|---|---|
| 2,630,906 A | 3/1953 | Philipp | |
| 2,981,402 A | 4/1961 | Cleaveland | |
| 3,132,459 A | 5/1964 | Grillot | |
| 3,133,625 A | 5/1964 | Best | |
| 3,279,592 A | 10/1966 | Kerkvliet | |
| 3,349,894 A | 10/1967 | Allen et al. | |
| 3,369,762 A | 2/1968 | Buzenberg et al. | |
| 3,556,057 A | 1/1971 | Icking | |
| 4,077,527 A | 3/1978 | Fryer et al. | |
| 4,220,242 A | 9/1980 | Forsberg | |
| 4,467,910 A | 8/1984 | Siwersson et al. | |
| 4,603,774 A | 8/1986 | Siwersson et al. | |
| 4,705,432 A | 11/1987 | Harbolt et al. | |
| 4,763,772 A * | 8/1988 | Gradoboev et al. | 198/398 |
| 4,852,719 A | 8/1989 | Lapeyre | |
| 5,222,591 A | 6/1993 | Bertola et al. | |
| 5,261,729 A | 11/1993 | Addington et al. | |
| 5,370,236 A * | 12/1994 | Wallace et al. | 209/173 |
| 6,170,768 B1 * | 1/2001 | Harmon et al. | 241/5 |
| 6,217,209 B1 | 4/2001 | Muller et al. | |
| 6,651,805 B2 * | 11/2003 | Yoshikawa | 198/676 |
| 6,932,210 B2 | 8/2005 | Kramer | |
| 7,314,131 B2 | 1/2008 | Olds | |

FOREIGN PATENT DOCUMENTS

FR   1034480   7/1953

OTHER PUBLICATIONS

U.S. Patent and Trademark Office; Search Report and Written Opinion in International Patent Application No. PCT/US2011/028809 dated May 19, 2011; 8 pages.

* cited by examiner

*Primary Examiner* — Douglas Hess
(74) *Attorney, Agent, or Firm* — Wood, Herron & Evans, LLP

(57) ABSTRACT

In one aspect, an elevating conveyor includes a vertical elevating member having a helical flight and a tubular barrel surrounding the elevating member. The tubular barrel is rotatable relative to the elevating member and is directed toward a centered position with respect to the elevating member by a centering assembly. In one embodiment, the centering assembly includes a plurality of rollers spaced circumferentially around the barrel and being movable in directions toward or away from the barrel. In another aspect, the conveyor has a modular construction that facilitates storage, transportation, and assembly of the conveyor in various heights. The elevating conveyor may further include a dust tube surrounding the barrel and defining a chamber therebetween. An end cap extends over and is spaced from the second end of the dust tube to define a gap through which dust generated by operation of the conveyor is drawn into the chamber.

20 Claims, 6 Drawing Sheets

ELEVATING CONVEYOR

TECHNICAL FIELD

The present invention relates generally to conveyors for transporting material from one location to another, and more particularly to an elevating conveyor for transporting materials between locations at different elevations.

BACKGROUND

Various types of conveyors are known in the art for transporting material or items from one location to another. One particular type of conveyor is an elevating conveyor that is configured to move material or items from a first location to a second location at a higher elevation than the first location. U.S. Pat. No. 7,314,131 discloses an elevating conveyor having a fixed elevating member with a helical flight and a rotating tubular barrel surrounding the elevating member. U.S. Pat. No. 7,314,131 is incorporated by reference herein in its entirety.

While elevating conveyors are useful for transporting materials between locations at different elevations, conventional elevating conveyors are fraught with several drawbacks. For example, since the height between the first and second locations is not generally the same for every application, conventional elevating conveyors must be custom made to the particular height needed for a given application. Transportation of conventional elevating conveyors can be expensive due to the need to move components having relatively long lengths. Moreover, transporting the lengthy components makes them susceptible to damage during transportation and prior to assembly at the intended location.

Conventional elevating conveyors also require relatively complicated bearing configurations to keep the rotating barrel centered relative to the stationary elevating member, and to maintain a relatively small clearance therebetween. Elevating conveyors which utilize drive belts to rotate the barrel relative to the elevating member generally require extensive disassembly of the entire elevating conveyor when the belts must be serviced or replaced.

A need therefore exits for an elevating conveyor that overcomes these and other drawbacks of conventional elevating conveyors.

BRIEF SUMMARY

The present invention overcomes the foregoing and other shortcomings and drawbacks of elevating conveyors heretofore known for use in various commercial and industrial environments. While the invention will be described in connection with certain embodiments, it will be understood that the invention is not limited to these embodiments. On the contrary, the invention includes all alternatives, modifications and equivalents as may be included within the spirit and scope of the present invention.

In one aspect, an elevating conveyor includes a vertical elevating member having a helical flight and a tubular barrel surrounding the elevating member. The tubular barrel is rotatable relative to the elevating member and is directed toward a centered position with respect to the elevating member by a centering assembly. In one embodiment, the centering assembly includes a plurality of rollers spaced circumferentially around the barrel and being movable in directions toward or away from the barrel. In another aspect, the conveyor has a modular construction that facilitates storage, transportation, and assembly of the conveyor in various heights. The elevating conveyor is assembled by coupling individual conveyor modules in an end-to-end arrangement to attain a desired conveyor height.

In another aspect, an elevating conveyor includes a vertical elevating member having a helical flight, and a tubular barrel surrounding the elevating member and being rotatable relative to the elevating member. An inlet proximate a first end of the elevating member receives material to be conveyed upwardly toward a discharge proximate a second end of the elevating member. The elevating conveyor further includes a dust tube surrounding the barrel and defining a chamber therebetween. The dust tube has a first end proximate the inlet and a second end proximate the second end of the elevating member. An end cap extends over and is spaced from the second end of the dust tube to define a gap through which dust generated by operation of the conveyor is drawn into the chamber.

Various additional advantages, objectives and features of the invention will become apparent to those of ordinary skill upon review of the following detailed description of the illustrative embodiments taken in conjunction with the accompanying drawings.

DETAILED DESCRIPTION

Figure 1:
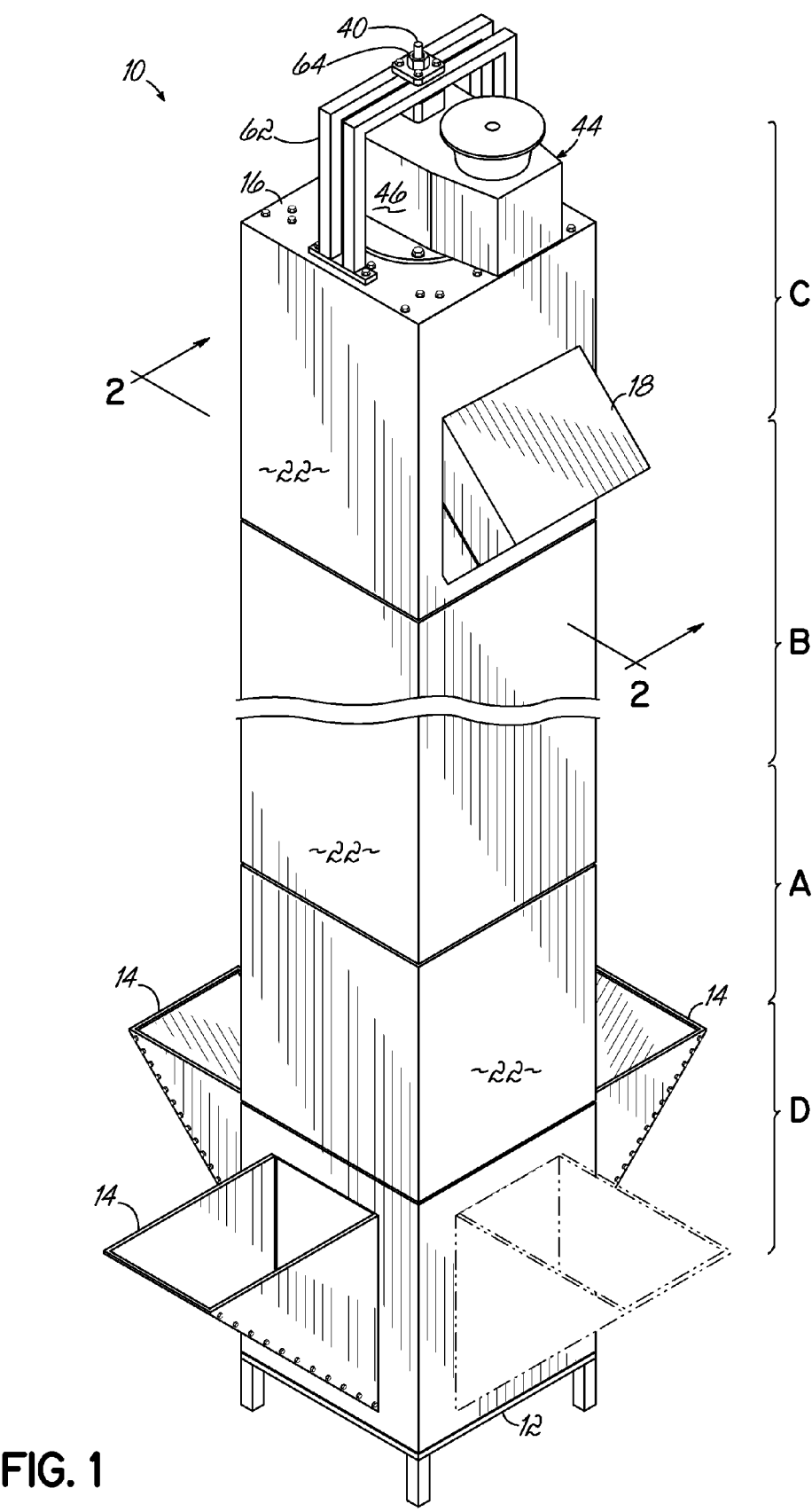
FIG. 1 is a perspective view of an exemplary elevating conveyor in accordance with the principles of the present disclosure.

FIG. 1 depicts an exemplary elevating conveyor assembly 10 in accordance with the principles of the present disclosure. A first end 12 of the elevating conveyor assembly 10 includes one or more hoppers 14 for receiving material to be transported by the conveyor assembly 10, from the first end 12 toward a second end 16 where the material is discharged through a discharge chute 18. In the embodiment shown, the elevating conveyor assembly 10 has a modular construction that facilitates assembly of the conveyor in various heights, as may be required to meet the particular needs of an application. The modular construction of the elevating conveyor assembly 10 also facilitates convenient storage and transportation of the elevating conveyor assembly 10, without incurring damage to the components of the conveyor assembly 10, and facilitates repair and/or servicing of the elevating conveyor assembly 10.

With continued reference to FIG. 1, and referring further to FIG. 2, the exemplary elevating conveyor assembly 10 includes a structural frame 20 that encloses and supports the internal components of the conveyor assembly 10, as will be described in more detail below, and which may be covered by outer panels 22 to form an enclosure. The elevating conveyor assembly 10 further includes a stationary, elongate elevating member 26 extending generally between the first and second ends 12, 16 of the conveyor assembly 10. In the embodiment shown, the elevating member 26 comprises a shaft 28 having a first end 28a secured to a pin 30 at the first end 12 of the conveyor assembly 10, and a second end 28b fixed proximate the second end 16 of the conveyor assembly 10. The elevating member 26 further includes a helical flight 30 extending along the length of the shaft 28. An elongate tubular barrel 32 extends generally between the first and second ends 12, 16 of the conveyor assembly 10 and surrounds the elevating member 26. The barrel 32 is rotatable relative to the fixed elevating member 26, whereby material to be transported by the conveyor assembly 10 is received in a first end 32a of the barrel 32 and is moved upwardly along the elevating member 26 toward a second end 32b of the barrel 32 proximate the discharge chute 18, as generally described in U.S. Pat. No. 7,314,131. To facilitate drawing material into the first end 32a of the barrel 32, the barrel 32 may include one or more scoops 34, or other structure suitable to draw material into the first end 32a. As the transported material reaches the second end 32b of the barrel 32, the material is transferred to the discharge chute 18 whereafter the material exits the conveyor assembly 10.

Figure 2:
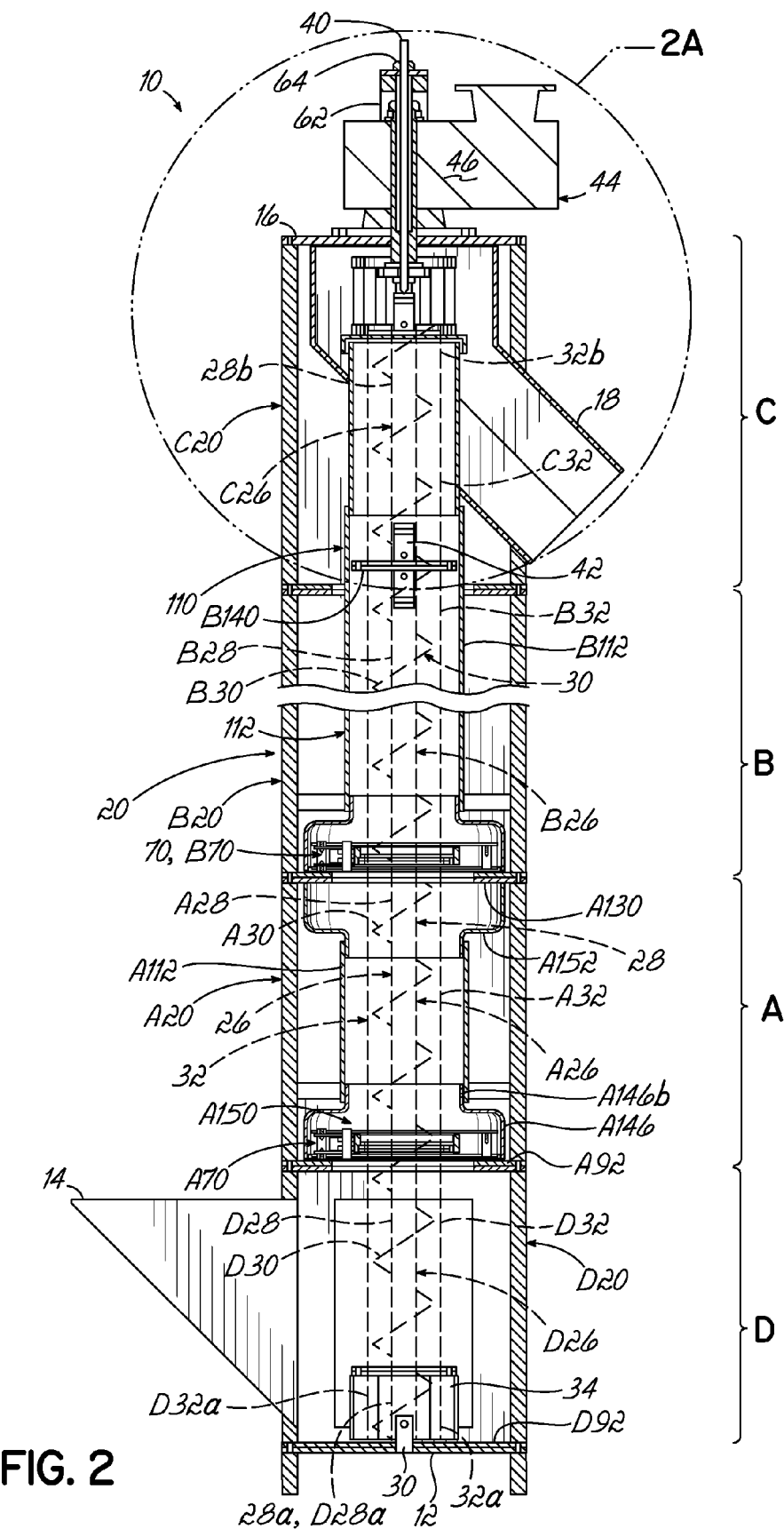
FIG. 2 is a cross-sectional view of the elevating conveyor of FIG. 1, taken along line 2-2.
Figure 2A:
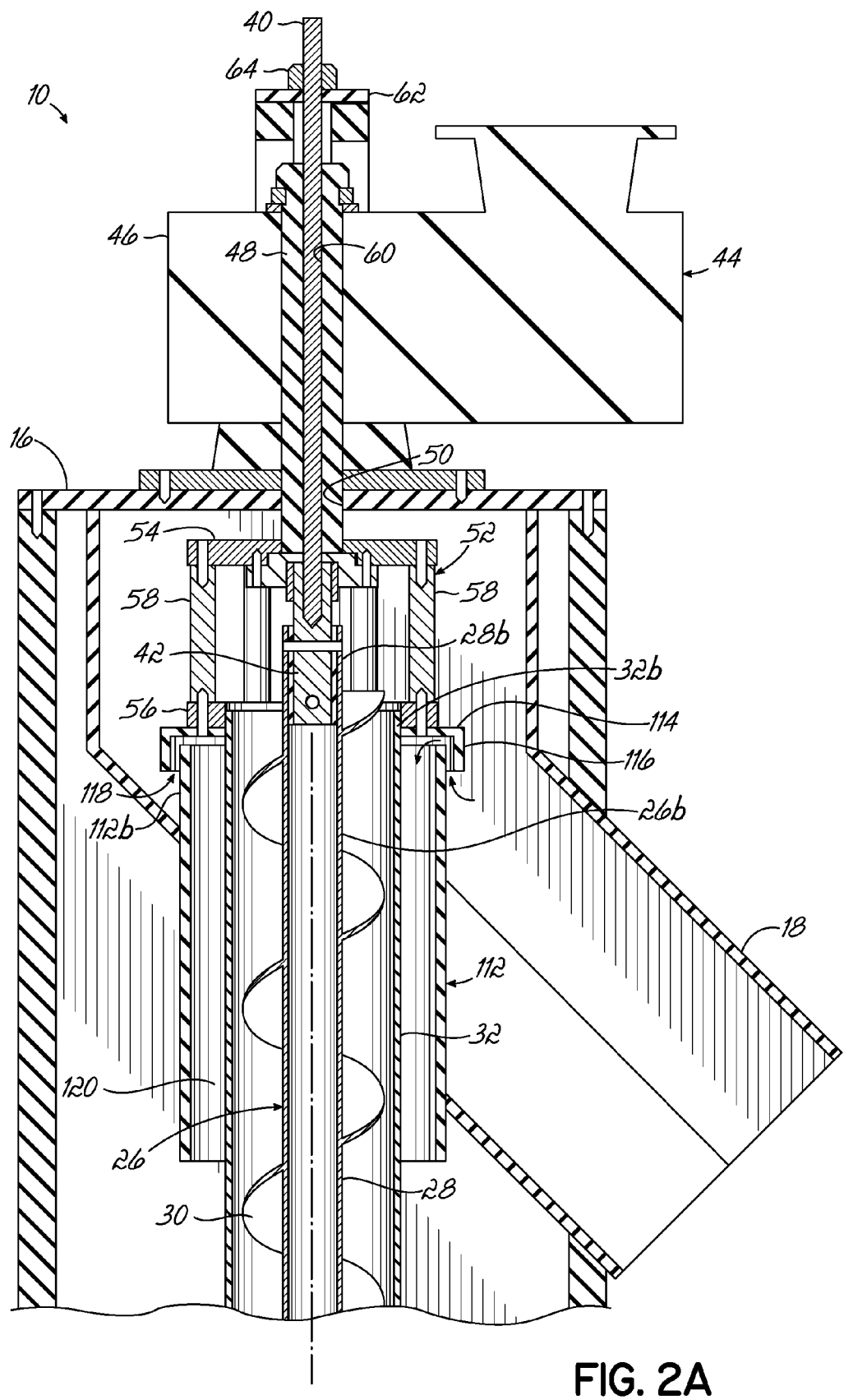
FIG. 2A is an enlarged detail view of the encircled area of FIG. 2.

FIG. 2A illustrates detail of the conveyor assembly 10 near the second end 16. The second end 26b of the elevating member 26 is secured to a threaded rod 40 by a shaft connector 42. A drive unit 44, including a motor (not shown) and a gear box 46 is secured atop the elevating conveyor assembly 10 at the second end 16. A hollow drive shaft 48 is coupled to the gear box 46 and extends through an opening 50 in the second end 16 of the conveyor assembly 10 and is operatively coupled to the second end 32b of the barrel 32, whereby the barrel 32 may be driven for rotation about the elevating member 26. In the embodiment shown, the elevating conveyor assembly 10 includes a squirrel cage 52 coupled between the second end 32b of the barrel 32 and the drive shaft 48 for rotation of the barrel 32 with the drive shaft 48. The squirrel cage 52 includes a top plate 54, a bottom plate 56, and a plurality of rods 58 extending between the top plate 54 and the bottom plate 56. As the transported material exits the second end 32b of the barrel 32, the rotating squirrel cage 52 facilitates distributing the material into the discharge chute 18.

The second end 26b of the elevating member 26 is coupled to the threaded rod 40 by shaft connector 42. The threaded rod 40 extends through the hollow central portion 60 of the drive shaft 48 and is secured to a support bracket 62 that is fixed to the second end 16 of the elevating conveyor assembly 10. With the first end 26a of the elevating member 26 secured to the pin 30 at the first end 12 of the conveyor assembly 10, as discussed above, the threaded rod 40 can be tightened, such as by turning a nut 64 received over the rod 40 to thereby place the elevating member 26 in tension. With the second end 32b of the barrel 32 coupled to the bottom plate 56 of the squirrel cage 52, the barrel 32 hangs from the squirrel cage 52 for rotation by the drive shaft 48.

Figure 4:
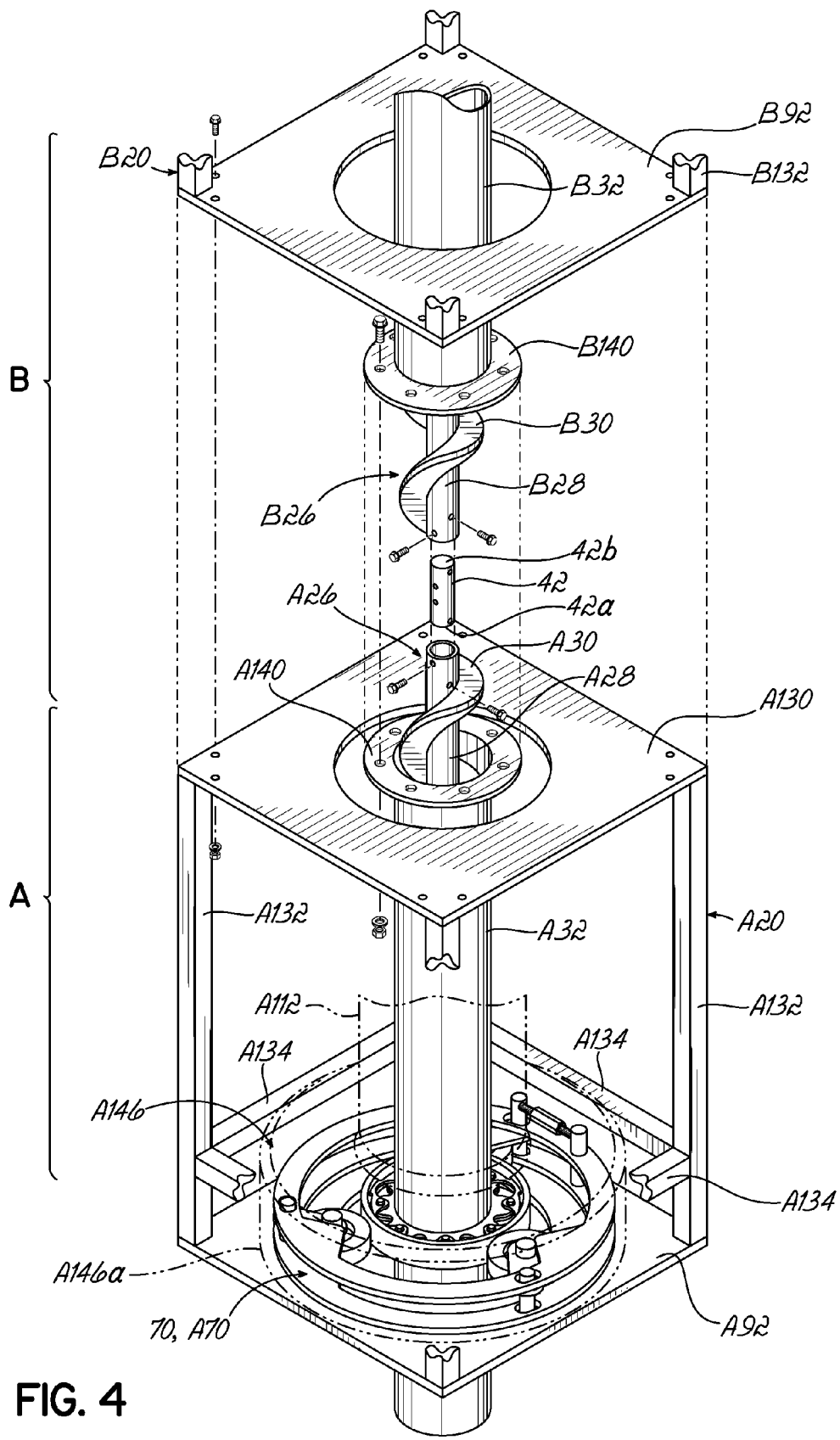
FIG. 4 is an exploded perspective view of the module of FIG. 3.
Figure 5:
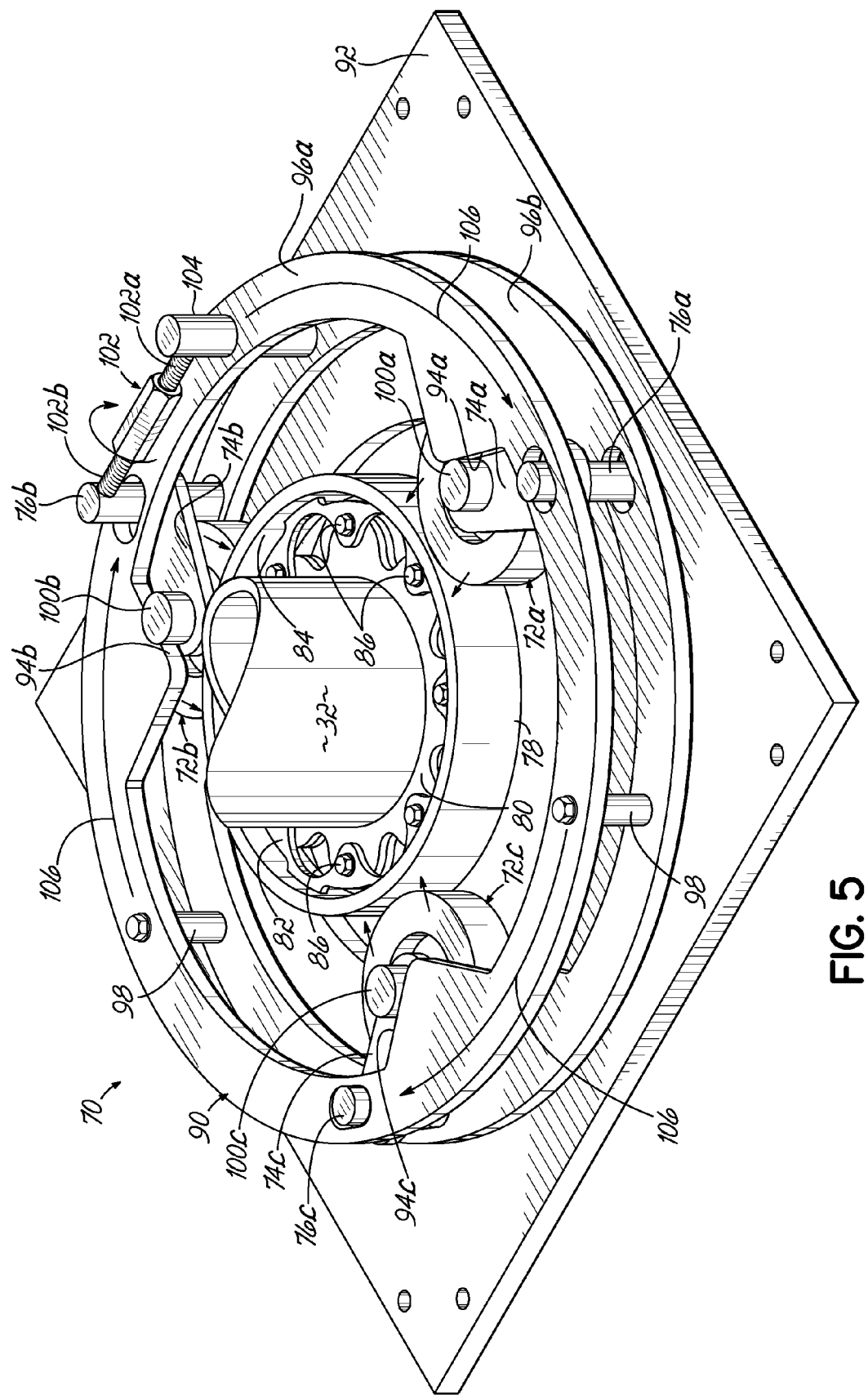
FIG. 5 is a perspective view of a centering assembly of the module depicted in FIG. 4.

With continued reference to FIG. 2, the elevating conveyor assembly 10 further includes at least one centering assembly 70 for centering the barrel 32 relative to the elevating member 26. FIGS. 4 and 5 depict an exemplary centering assembly 70 in accordance with the principles of the present invention. In this embodiment, the centering assembly 70 includes a plurality of rollers 72a, 72b, 72c spaced radially outwardly from, and circumferentially around, the barrel 32. The embodiment shown includes three rollers 72a, 72b, 72c spaced generally equidistant around the outer circumference of the barrel 32. It will be appreciated, however, that more than three or fewer than three rollers may alternatively be utilized to center the barrel 32 relative to the elevating member 26. Each roller 72a, 72b, 72c is supported on an arm 74a, 74b, 74c for pivotal movement about a generally vertical axis defined by respective pivot pins 76a, 76b, 76c, such that the rollers 72a, 72b, 72c are movable in directions toward or away from the barrel 32. As the rollers 72a, 72b, 72c are moved radially inwardly toward barrel 32, the rollers 72a, 72b, 72c engage an inner ring 78 coupled to the barrel 32 and urge the barrel 32 toward a centered position relative to the elevating member 26. In the embodiment shown, the inner ring 78 is secured to the tubular barrel 32 by a flange plate 80 fixed to the barrel 32 and a connector plate 82 fixed to an inner wall 84 of the inner ring 82. In this embodiment, the flange plate 80 is fastened to the connector plate 82 by bolts 86, however, it will be appreciated that various other structure may be used to couple flange plate 80 to connector plate 82.

The centering assembly 70 further includes an outer ring assembly 90 surrounding the inner ring 78 and secured to a base plate 92 of the frame structure 20 of the elevating conveyor assembly 10. The outer ring assembly 90 includes at least one cam surface 94a, 94b, 94c configured to engage the rollers 72a, 72b, 72c and to move the rollers 72a, 72b, 72c toward or away from the inner ring 78 when the outer ring assembly 90 is moved in circumferential directions relative to the inner ring 78. Specifically, as the cam surface 94a, 94b, 94c engages the rollers 72a, 72b, 72c, the rollers 72a, 72b, 72c act as cam followers and are moved by the cam surface 94a, 94b, 94c in directions toward or away from the inner ring 78.

In the embodiment shown, the outer ring assembly 90 includes upper and lower ring members 96a, 96b secured together in spaced relation by standoffs 98 extending therebetween. The rollers 72a, 72b, 72c are positioned between the upper ring member 96a and the lower ring member 96b for pivotal movement on respective arms 74a, 74b, 74c as described above. Cam surfaces 94a, 94b, 94c are provided on the upper ring member 96a proximate each roller 72a, 72b, 72c for engaging corresponding projections 100a, 100b, 100c associated with the respective rollers 72a, 72b, 72c to cause the rollers 72a, 72b, 72c to move in directions toward or away from the barrel 32. A turnbuckle-type connector 102 has a first end 102a coupled to a first post 104 that is secured to the outer ring assembly 90, and a second end 102b coupled to pivot pin 76b, which is in turn secured to base plate 92 of frame structure 20. Adjustment of the connector 102 causes the outer ring assembly 90 to move in a circumferential direction, as depicted by arrows 106. As the outer ring assembly 90 moves in the circumferential direction shown, the rollers 72a, 72b, 72c are moved inwardly by the respective cam surfaces 94a, 94b, 94c to engage the inner ring 78 and thereby move the barrel 32 toward a centered position relative to the elevating member 26. Likewise, movement of the outer ring assembly 90 in the opposite circumferential direction allows to the rollers 72a, 72b, 72c to move outwardly away from the inner ring 78.

Figure 3:
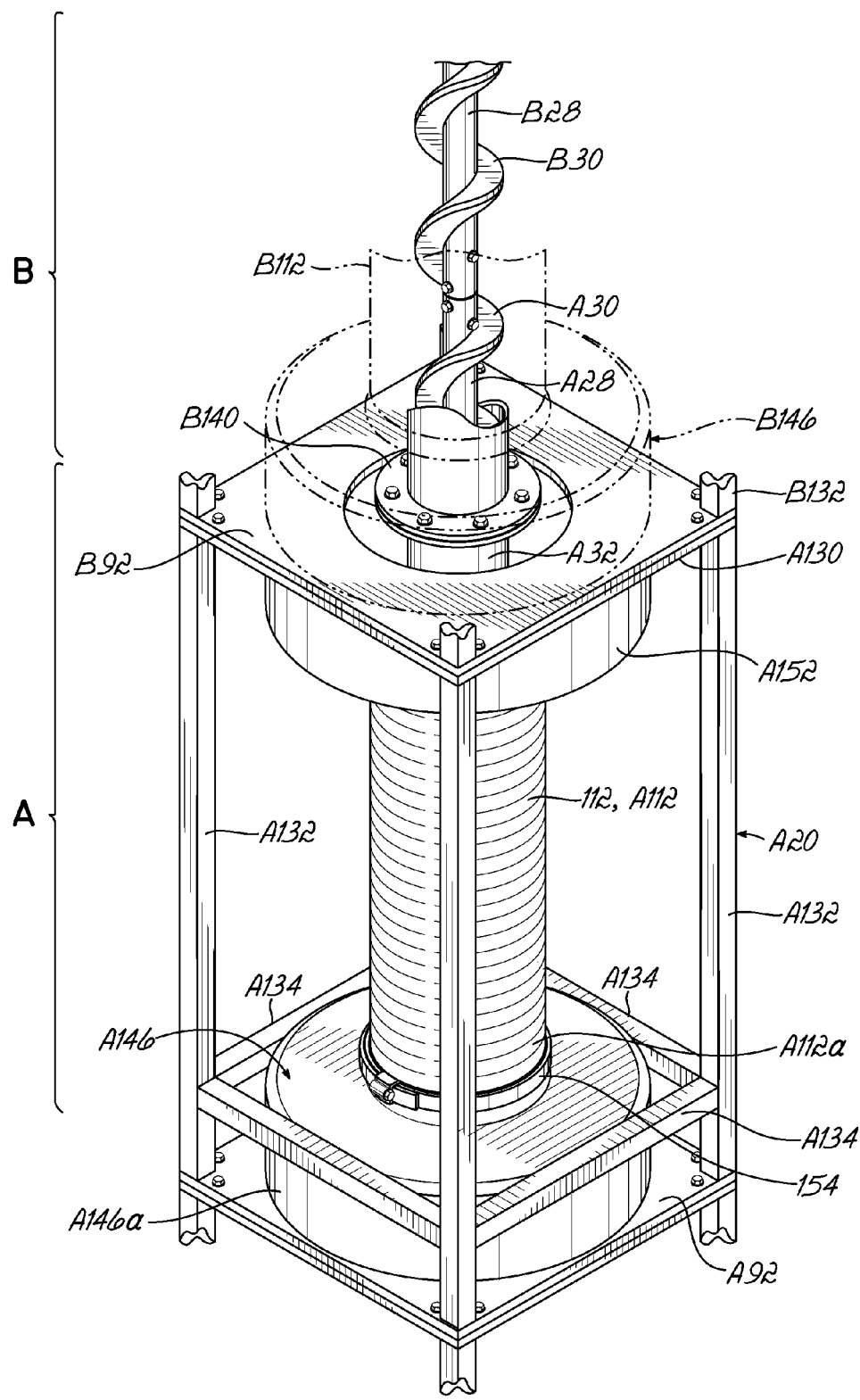
FIG. 3 is a partial perspective view of an exemplary module of the elevating conveyor of FIG. 1, with outer panels removed.

Referring now to FIGS. 2 and 3, the elevating conveyor assembly 10 further includes a dust recovery assembly 110 for containing dust generated by the transport of material by the elevating conveyor assembly 10. In the embodiment shown, the dust recovery assembly 110 includes a dust tube assembly 112 surrounding the barrel 32 and extending generally between the first and second ends 12, 16 of the elevating conveyor assembly 10. With reference to FIG. 2A, the second end 112b of the dust tube assembly 112 is secured to the discharge chute 18 and extends into the discharge chute 18, proximate the second end 32b of the barrel 32. In the embodiment shown, the discharge chute 18 and at least the second end 112b of the dust tube assembly 112 may be formed from metal. The second end 112b of the dust tube assembly 112 may be joined to the discharge chute 18 by welding or any other suitable method.

The dust recovery assembly 110 further includes an end cap 114 secured to the bottom plate 56 of the squirrel cage 52. A peripheral lip 116 of the end cap 114 extends over the second end 112*b* of the dust tube assembly 112. The end cap 114 is spaced from the second end 112*b* of the dust tube assembly 112 to define a gap 118 therebetween. Accordingly, no seals are required between the second end 112*b* of the dust tube assembly 112 and the end cap 114, which rotates with the barrel 32 and the squirrel cage 52. Any dust or fine particulate matter exiting the second end 32*b* of the barrel 32 is either discharged with the transported material through the discharge chute 18, or enters a chamber 120 defined between the outer surface of the barrel 32 and the inner surface of the dust tube assembly 112 through the gap 118. Dust entering the chamber 120 is drawn downwardly by gravity toward the first end 12 of the elevating conveyor assembly 10. To facilitate drawing dust through the chamber 120, a negative pressure may be applied to the chamber 120.

In another aspect in accordance with the principles of the present disclosure, the elevating conveyor assembly 10 may have a modular construction as described above. The modular elevating conveyor 10 includes plural discrete conveyor modules A, B that can be coupled end-to-end to form a generally vertical elevating conveyor assembly, as depicted in FIGS. 1-4. As described herein, reference numerals associated with the components of each module are similar to the reference numerals for the overall conveyor components, but further include a prefix identifying the module. In the embodiments depicted in FIGS. 1-4, each module A, B includes a generally vertical elevating member section A26, B26 including a shaft portion A28, B28 and a helical flight A30, B30 extending along the shaft portion A28, B28. Each module A, B further includes a tubular barrel section A32, B32 surrounding the elevating member section A26, B26 and being rotatable relative to the elevating member section A26, B26 about a longitudinal axis. Each module A, B further includes a structural frame A20, B20 including a base plate A92, B92 and an end plate A130, B130 spaced vertically from the base plate A92, B92. Generally elongate vertical framing members A132, B132 extend between the base plate A92, B92 and the end plate A130, B130 to provide structural rigidity to the frame A20, B20. Additional framing members A134 may extend between the generally vertical framing members A132, B132 to provide additional rigidity and support to the frame structure A20, B20. The frame A20, B20 of each module, including the base plate A92, B92, end plate A130, B130, and framing members A132, B132, A134, B134, may be formed from metal or any other suitable material.

Adjacent conveyor modules A, B are coupled together by placing one conveyor module atop another, such that the end plate A130 of a first conveyor module A confronts the base plate B92 of a second conveyor module B, as depicted in FIGS. 2, 3, and 4. The confronting base plate B92 and end plate A130 of adjacent modules A, B may be secured by fasteners or other suitable structure. As a result of the modular construction, the elevating member 26 and tubular barrel 32 described above are divided in discrete sections associated with each module A, B, as depicted in FIG. 4. The coupling of adjacent conveyor modules A, B, therefore, further includes coupling adjacent elevating members A26, B26 and adjacent barrel sections A32, B32. In the embodiment shown, a first elevating member section A26 is coupled to a second elevating member section B26 by a shaft connector 42 having a first end 42*a* operatively coupled to the shaft portion A28 of the first elevating member section A26 and a second end 42*b* operatively coupled to the shaft portion A28 of the second elevating member section B26. Each barrel section A32, B32 includes radially outwardly extending flanges A140, B140 at its respective distal ends, whereby a first barrel section A32 may be coupled to a second barrel section B32 by joining the respective flanges A140, B140 with bolts or other suitable fastening structure.

In some embodiments, a conveyor module A may further include a centering assembly A70 for centering the barrel section A32 relative to the elevating member section A26, as described above. Conveyor modules B that are coupled to an adjacent conveyor module A having a centering assembly A70 may or may not also include a centering assembly B70.

Conveyor modules A, B in accordance with the principles of the present invention may further include dust tube sections A112, B112 surrounding the barrel sections A32, B32 of the modules A, B. Each dust tube section A112, B112 is configured to be operatively coupled to the dust tube sections A112, B112 of adjacent modules A, B. If a conveyor module A, B includes a centering assembly A70, B70, the module A, B further includes a dust housing A146 enclosing the centering assembly A70 therein. In the embodiments shown, the dust housing A146 comprises a generally bell-shaped structure A146*a* defining a chamber A150 for receiving a centering assembly A70 therein, and having a reduced portion A146*b* with an opening for coupling to the dust tube section A112. When a conveyor module A is to be coupled to an adjacent conveyor module B that also includes a centering assembly B70, the module A will further include a second dust housing A152 secured to the end plate A130 of the module A so that when the module A is coupled with the adjacent module B, the dust housings A146, B146, A152 and dust tube sections A112, B112 define a continuous chamber 120 substantially isolated from the environment.

In the embodiment shown in FIG. 3, the dust tube sections A112, B112 for the conveyor modules A, B may comprise length-adjustable tube structure to facilitate coupling the dust tube sections A112, B112 to adjacent modules A, B. In the particular embodiment depicted in FIG. 3, the length-adjustable dust tube section A112 has a first end A112*a* operatively coupled to a dust housing A146, such as by an adjustable hose clamp 154, and a second end operatively coupled to the second dust housing A152.

Referring again to FIGS. 1 and 2, a modular elevating conveyor 10 in accordance with the principles of the present disclosure may be constructed by coupling at least first and second conveyor modules A, B in an end-to-end arrangement to form the generally vertical elevating conveyor structure. Additional modules A, B may alternatively be included to extend the height of the elevating conveyor 10 to achieve a desired conveyor height. The elevating member sections A26, B26 and tubular barrel sections A32, B32 of each module A, B are coupled together, as described above, and the frame structures A20, B20 of each module A, B are secured by fastening the respective end plates A130, B130 and base plates A92, B92. When the desired height is attained, a discharge end module C is coupled to the second end 16 of the modular conveyor construction. A discharge end module C includes a frame section C20, an elevating member section C26, and a barrel section C32 as described above. The discharge end module C further includes a discharge chute 18 in communication with the second end of the barrel section C32 and the second end of the elevating member C26, as depicted in FIG. 2, whereby material conveyed along the elevating member C26 is received into the discharge chute 18 from the second end of the barrel section C32.

The modular elevating conveyor 10 further includes an inlet end module D at the first end 12 of the elevating conveyor assembly 10. The inlet end module D includes a generally vertical inlet elevating member section D26 having a shaft portion D28 and a helical flight D30 extending along the shaft portion D28, similar to the conveyor modules A, B discussed above. An inlet barrel section D32 surrounds the inlet elevating member section D26 and is operatively coupled to the barrel section A32 of an adjacent conveyor module A. A first end D28a of the shaft portion D28 of the inlet elevating member D26 section is secured to a pin 30 located on the base plate D92 of the module frame structure D20, and a second end D28b of the shaft portion D28 of the elevating member section D26 is coupled to the adjacent elevating member A28 by a shaft connector in a manner similar to that described above. The inlet end module D further includes at least one hopper 14 for admitting material to be conveyed into the interior of the module D. As the barrel section D32 rotates relative to the stationary elevating member section D26, scoop structure 34 located at the distal first end D32a of the barrel section D32 draws material into the interior of the barrel section D32 for movement vertically upwardly along the elevating member D26, as generally described in U.S. Pat. No. 7,314,131.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. An elevating conveyor, comprising:
    a generally vertical, stationary elevating member including a helical flight;
    a tubular barrel surrounding said elevating member and being rotatable with respect to said elevating member about a longitudinal axis thereof; and
    at least one centering assembly centering said barrel relative to said elevating member, said centering assembly comprising:
        a plurality of rollers spaced radially outwardly from and circumferentially around an outer surface of said barrel, said centering assembly operable to simultaneously move said rollers in directions toward or away from said barrel such that said rollers direct said barrel toward an axially centered position with respect to said elevating member.

2. The elevating conveyor of claim 1, wherein said centering assembly further comprises:
    an inner ring operatively fixed to said barrel; and
    an outer ring spaced radially outwardly from said inner ring;
    said outer ring urging said plurality of rollers in radially inward directions to engage said inner ring and thereby direct said barrel toward the axially centered position.

3. The elevating conveyor of claim 2, wherein said centering assembly further comprises:
    at least one cam surface on said outer ring;
    said cam surface moving said rollers toward or away from said inner ring when said outer ring is moved in a circumferential direction.

4. The elevating conveyor of claim 3, wherein each said roller is supported on a respective arm for pivotal movement about an axis, such that said roller is moved toward or away from said inner ring as said outer ring is moved in said circumferential direction.

5. The elevating conveyor of claim 2, further comprising:
    a flange plate on said barrel; and
    a connector plate on said inner ring;
    said connector plate removably coupled to said flange plate such that said inner ring rotates with said barrel and centers said barrel relative to said elevating member when said rollers engage said inner ring.

6. The elevating conveyor of claim 5, wherein said flange plate has an outer peripheral profile and said connector plate has an annular inner profile complimentary to said outer peripheral profile, whereby said flange plate and said connector plate can be uncoupled to facilitate removal of said barrel.

7. The elevating conveyor of claim 1, further comprising:
    a drive shaft operatively coupled to a terminal end of said barrel; and
    a drive unit operatively coupled to said drive shaft for driving said barrel for rotation relative to said elevating member.

8. The elevating conveyor of claim 7, further comprising:
    a squirrel cage coupled between said drive shaft and said terminal end of said barrel, said squirrel cage transmitting rotation of said drive shaft to said barrel.

9. A modular elevating conveyor, comprising:
    a first conveyor module and a second conveyor module coupled end-to-end to form a generally vertical elevating conveyor;
    said first conveyor module comprising;
        a first generally vertical elevating member section including a shaft portion and a helical flight extending along said shaft portion,
        a first tubular barrel section surrounding said first elevating member section and being rotatable relative to said first elevating member section about a longitudinal axis thereof, and
        a first centering assembly centering said first barrel section relative to said first elevating member section;
    said second conveyor module comprising;
        a second generally vertical elevating member section including a shaft portion and a helical flight extending along said shaft portion, and
        a second tubular barrel section surrounding said second elevating member section and being rotatable relative to said elevating member section about a longitudinal axis thereof, said second barrel section operatively coupled to said first barrel section for rotation therewith; and
    a shaft connector having a first end operatively coupled to said shaft portion of said first elevating member section and a second end operatively coupled to said shaft portion of said first elevating member section.

10. The modular elevating conveyor of claim 9, wherein said first centering assembly comprises:
    a plurality of rollers spaced radially outwardly from and circumferentially around an outer surface of said first barrel section, said rollers directing said first barrel section toward an axially centered position with respect to said first elevating member section.

11. The modular elevating conveyor of claim 9, wherein:
    said first module includes a first dust tube section surrounding said first barrel section; and
    said second module includes a second dust tube section surrounding said second barrel section, said second dust tube section operatively coupled to said first dust tube section to define a chamber for containing dust generated by the elevating conveyor.

12. The modular elevating conveyor of claim 11, wherein said first conveyor module further comprises:
a first dust housing surrounding said first centering assembly and coupled to said first dust tube.

13. The modular elevating conveyor of claim 12, wherein: said second conveyor module further comprises:
a second centering assembly centering said second barrel section relative to said second elevating member, and
a second dust housing surrounding said second centering assembly and coupled to said second dust tube; and wherein
said first conveyor module further includes a third dust housing having a first end coupled to said first dust tube and a second end communicating said second dust housing.

14. The modular elevating conveyor of claim 9, wherein: said first conveyor module further comprises a first frame section, said first frame section including a base plate, an end plate, and a plurality of frame members extending between said base plate and said end plate and surrounding said first barrel section; and wherein
said second conveyor module comprises a second frame section, said second frame section including a base plate, an end plate, and a plurality of frame members extending between said base plate and said end plate and surrounding said second barrel section;
said second frame section operatively coupled to said first frame section such that said base plate of said second frame section confronts said end plate of said first frame section.

15. The modular elevating conveyor of claim 9, wherein said second conveyor module is a discharge end module, said discharge end module further comprising:
a discharge chute in communication with a terminal end of said second barrel section and with a terminal end of said helical flight of said second elevating member section to receive conveyed material therefrom.

16. The modular elevating conveyor of claim 9, further comprising:
an inlet end module operatively coupled to said first conveyor module, said inlet end module comprising:
a generally vertical inlet elevating member section including a shaft portion and a helical flight extending along said shaft portion, a first end of said inlet elevating member section coupled to said first elevating member section; and
an inlet barrel section having a first end operatively coupled to said first barrel section for rotation therewith.

17. An elevating conveyor, comprising:
a generally vertical, stationary elevating member including a helical flight, said elevating member having a first terminal end and a second terminal end;
a tubular barrel surrounding said elevating member and being rotatable with respect to said elevating member about a longitudinal axis thereof;
an inlet proximate said first end of said elevating member for receiving material to be conveyed upwardly by said elevating member;
a discharge proximate said second end of said elevating member; and a dust recovery assembly for containing dust generated by the elevating conveyor, said dust recovery system comprising:
a dust tube surrounding said barrel to define a chamber therebetween, said dust tube having a first terminal end proximate said inlet and a second terminal end proximate said second end of said elevating member, and
an end cap extending over said second terminal end of said dust tube, said end cap spaced from said second terminal end to define a gap therebetween, whereby any dust generated by the elevating conveyor is drawn into said chamber through said gap.

18. The elevating conveyor of claim 17, further comprising:
an aperture through said end cap;
said barrel extending through said dust cap for communication with said discharge whereby material conveyed through said barrel is received by said discharge.

19. The elevating conveyor of claim 17, further comprising:
a dust housing positioned intermediate said inlet and said discharge and surrounding said barrel;
wherein said dust tube comprises:
a first dust tube section having a first end coupled to said dust housing and a second end extending toward said discharge, and
a second dust tube section having a first end coupled to said dust housing and a second end extending toward said inlet.

20. The elevating conveyor of claim 19, further comprising:
a centering assembly centering said barrel relative to said elevating member, said centering assembly disposed within said dust housing.

* * * * *

UNITED STATES PATENT AND TRADEMARK OFFICE
CERTIFICATE OF CORRECTION

PATENT NO. : 8,448,779 B2  
APPLICATION NO. : 12/883293  
DATED : May 28, 2013  
INVENTOR(S) : Richard E. Brock Page 1 of 1

It is certified that error appears in the above-identified patent and that said Letters Patent is hereby corrected as shown below:

In the Specifications:

Column 4,
Lines 51-52 reads "allows to the rollers ... to move" and should read -- allows the rollers ... to move --.

In the Claims:

Claim 6, Column 8,
Line 15 reads "has an annular inner profile complimentary to said outer" and should read -- has an annular inner profile complementary to said outer --.

Claim 9, Column 4,
Line 32 reads "said first conveyor module comprising;" and should read -- said first conveyor module comprising: --.

Line 42 reads "said first conveyor module comprising;" and should read -- said first conveyor module comprising: --.

Claim 13, Column 9,
Line 18 reads "and a second end communicating said second dust housing" and should read -- and a second end communicating with said second dust housing --.

Signed and Sealed this
Sixth Day of August, 2013

Teresa Stanek Rea
*Acting Director of the United States Patent and Trademark Office*